June 22, 1965  H. J. SCHWERDHÖFER ETAL  3,190,415
FREE-WHEELING HUB WITH COASTER BRAKE
Filed Jan. 24, 1962  2 Sheets-Sheet 1

INVENTORS
Hans Joachim Schwerdhöfer
Paul Dotter
Max Kimpflinger
By Richard Low
Agt June 22, 1965   H. J. SCHWERDHÖFER ETAL   3,190,415
FREE-WHEELING HUB WITH COASTER BRAKE Filed Jan. 24, 1962   2 Sheets-Sheet 2

INVENTORS
Hans Joachim Schwerdhöfer
Paul Dotter
Max Kimpflinger
By Richard [...]
   agt

United States Patent Office 3,190,415
Patented June 22, 1965

3,190,415
FREE-WHEELING HUB WITH COASTER BRAKE
Hans Joachim Schwerdhöfer, Paul Dotter, and Max Kimpflinger, all of Schweinfurt (Main), Germany, assignors to Fichtel & Sachs A.G., Schweinfurt (Main), Germany, a corporation of Germany
Filed Jan. 24, 1962, Ser. No. 168,443
Claims priority, application Germany, Jan. 28, 1961, F 33,087; Feb. 3, 1961, F 33,128
10 Claims. (Cl. 192—6)

This invention relates to a wheel hub for bicycles and the like, and more particularly to an improved free-wheeling hub with coaster brake.

Conventional hubs of the afore-mentioned type are generally conspicuous by their relatively large diameter. This large diameter of coaster brake hubs is not necessary for structural strength since hubs of much smaller diameter would be very adequate in this respect. In the more advanced types of coaster brake hubs, the space required for housing the working elements of the hub is generally much smaller than the volume of the hub. Hub shells of large diameter have been commonly employed for coaster brake hubs because of difficulties in assembling smaller hub shells with the working elements of the brake in large scale production. A coaster brake hub capable of being assembled rapidly and inexpensively in a hub shell of small diameter was heretofore not available.

The object of the invention is the provision of a wheel hub of the type described which is of much smaller diameter than otherwise comparable conventional hubs.

Another object is the proivison of such a hub which is quickly assembled from the constituent parts without extensive use of tools.

A concomitant object is the provision of a hub the smaller size of which provides a saving in material cost.

A further object is the provision of such a hub which employs a plurality of identical bearings, thereby reducing the number of items to be stocked for manufacture and repair of the hub.

An important object is the provision of a coaster brake hub equipped with anti-friction bearings, for example ball bearings, in which the anti-friction members, such as bearing balls, are handled during manufacture of the hub in the form of pre-arranged assemblies. The several anti-friction members are held in spaced relationship in the assembly by an annular cage. The virtual necessity of avoiding the handling of individual bearing balls during manufacture of coaster brake hubs has been a decisive factor in the choice of oversized hub shells in conventional hubs. Labor for handling bearing balls in any manner other than in annular assemblies including a cage is prohibitively costly.

Other objects and advantages of the invention will hereinafter become more fully apparent from the following description of the annexed drawings, which illustrate preferred embodiments of the invention and a conventional coaster brake hub with the improvement of which this invention is concerned.

Figure 1:
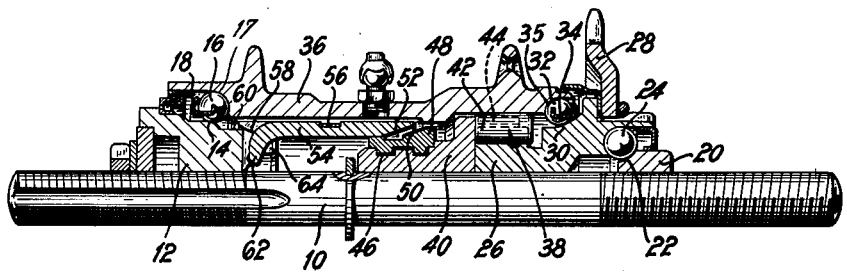
FIG. 1 is an axially sectional view of one half of a known coaster brake hub.

Referring now to FIG. 1 in detail, there is shown a known coaster brake hub to illustrate the problem to which this invention relates, and the type of structure with the improvement of which it is concerned.

The free-wheeling coaster hub shown in axial section is mounted on a stationary, partly threaded axle 10. The axle is equipped to be mounted in the rear wheel fork of a bicycle or motorcycle, as is usual. It threadedly carries near one end a stationary bearing member 12 which partly projects from a hub shell 36. The member 12 is formed with the inner race 14 of a ball bearing the balls 16 of which are held in uniformly spaced relationship in the recesses of an annular cage 18. The cage 18 and its balls 16 are pre-assembled, and the assembly is installed in the hub as a unit for the compelling reasons outlined above. The balls 16 roll on an external race 17 on the inner face of the shell 36. The bearing member 12 flares outward of the shell cavity from the bearing race 14 to prevent axially outward displacement of the ball-bearing assembly.

Another bearing member 20 is threadedly mounted near the other end of the axle 10. It is formed with an internal ball bearing race 22 for bearing balls 24 assembled in a non-illustrated cage in the manner described above. A tubular driver member 26 is rotatably supported on the balls 24. The driver member 26 is fixedly fastened to a sprocket 28 over which a chain can be trained.

An annular external face of the driver member 26 forms a bearing race 30 for bearing balls 32 assembled into an annular unit with a cage 34. The balls 32 roll on a bearing race 35 on the inside of the hub shell 36.

Power is transmitted from the sprocket 28 by the driver member 26 to the shell 36 by means of a friction coupling or roller clutch 38. The clutch includes a spider member 40 which carries five clutch rollers 42 which are uniformly spaced about the axis of the hub and are positioned between forked retaining members 44 of the spider member 40. The spider member 40 is freely rotatable on the axle 10. A portion of the spider member axially spaced from the clutch rollers 42 has an external flat thread 46 which engages a mating internal thread on a ring 48. The ring has an external conically tapering annular face 50.

The conical face 50 is engageable with an internal conical annular face 52 of an expandable tubular brake sleeve 54. The axial end portion of the sleeve 54 adjacent the ring 48 is axially slotted in a non-illustrated manner, and the axially elongated strips of material which are separated by the slots are urged radially inward and toward each other by an annular spring 56. The other axial end of the sleeve also has an internal annular engagement face 58 of conical shape which is radially aligned with an annular edge portion 60 of the stationary bearing member 12.

Portions of the brake sleeve 54 are bent radially inward to form lugs 62 which are engaged by axial projections 64 on the bearing member 12 and secure the brake sleeve against rotation.

During normal pedalling, the rollers 42 of the friction clutch 38 move radially outward on inclined faces of the driver member 26 into engagement with the internal face of the hub shell 36. Frictional forces and forces of inertia cooperate to move the ring 48 on the spider member 40 away from the brake sleeve 54. During back-pedalling, the clutch rollers 42 release the hub, and the ring 48 moves toward the brake sleeve 54. The conical outer face 50 of the ring engages the corresponding face 52 of the brake sleeve, and the sleeve is initially shifted toward the bearing member 12. When engagement of the annular edge portion 60 of the latter member interferes with further axial movement of the brake sleeve, the sleeve is radially expanded by the engagement of its conical faces 52, 58 with the face 50 of the ring 48 and the edge portion 60 of the bearing member 12 respectively. Outer face portions of the stationary brake sleeve are forced thereby into frictional braking engagement with corresponding portions of the inner face of the rotating shell 36.

When the coaster hub shown in FIG. 1 is being assembled, the cage 18 holding the balls 16 is first slipped over the bearing member 12, and the bearing member with the anti-friction assembly mounted thereon is then inserted into the cavity of the shell 36. It is necessary that the diameter of the bearing member 12 increase outwardly of the bearing race 14 so that the cage be held in place, and it is therefore unavoidable that the anti-friction assembly be axially moved over the edge portion 60 into its position on the race 14. The internal diameter of the anti-friction assembly in the conventional coaster hub of FIG. 1 must be greater than the diameter of the annular edge portion 60 of the bearing member 12.

The consequences of this dimensional relationship hitherto considered necessary are evident from FIG. 1. The diameter of the brake sleeve 54 and the inner diameter of the hub shell determine the brake effect available. The bearing member 12 is much heavier than would be required by considerations of structural strength.

It would be possible to greatly reduce the diameter of the bearing member 12, of the ball bearing mounted thereon, and of the shell 36 if the balls 16 were installed individually on the bearing member 12, but such a procedure is entirely impractical because of the labor cost involved.

Figure 2:
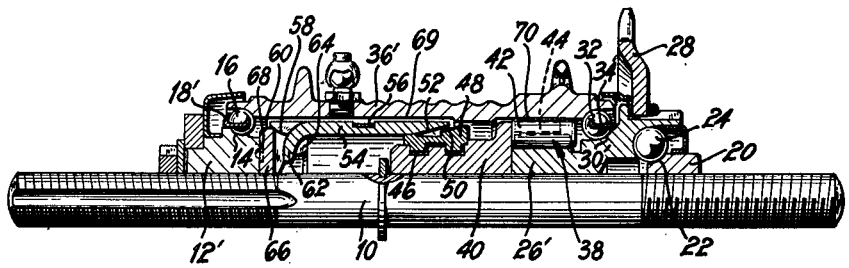
FIG. 2 shows a first embodiment of this invention in a view corresponding to that of FIG. 1.

FIG. 2 shows the improved hub of the invention which is similar in structure and operation to the free-wheeling hub shown in FIG. 1. Identical elements have been provided with identical reference numerals and require no further description.

The internal bearing member 12 has been split in the embodiment of the invention illustrated in FIG. 2 into two continguously arranged separate parts or portions 12' and 66. The portion 12' corresponds to the outer portion of the bearing member 12, but is of much smaller diameter. It is formed with an inner bearing race 14' of correspondingly reduced diameter on which a smaller number of bearing balls 16 is spacedly retained in a cage 18'. Except for a corrugation pattern of mainly decorative value, the hub shell 36' is a cylindrical tube of approximately uniform wall thickness, and of substantially smaller wall thickness than the hub shell 36 seen in FIG. 1. The diameter of the bearing race 14' is selected to conform to the dimensions of the corresponding outer bearing race on the shell 36'. The edge portion 60 of the bearing member has not been changed in size, and the braking effect of the hub shown in FIG. 2 is as great as that of the hub illustrated in FIG. 1.

The edge portion 60 is integral with the second portion 66 of the bearing member carrying the projections 64 which prevent rotation of the brake sleeve while it is being engaged between the ring 48 and the edge portion 60.

The portion 66 of the bearing member is internally threaded in such a manner that the threads in the portion 66 and the portion 12' of the bearing member are continuous when the opposite radial faces of the two portions are directly superimposed in proper angular alignment. These faces, which jointly determine an annular interface 68, are respectively formed with mating recesses and projections which lock the two aligned portions of the bearing member against relative rotation. The portions 12' and 66 in threaded engagement with the axle 10 thus constitute an inner bearing race member arrangement which is analogous to the member 12 shown in FIG. 1, when axially continguous, and provide axial access to the race 14 when separated by threaded movement on the axle 10.

When the hub shown in FIG. 2 is to be assembled, the cage 18' with the balls 16 retained therein is slipped over the bearing member portion 12' only. The other bearing member portion 66 is then positioned by engagement of the projections and recesses on the interface 68, and the assembled bearing member, with the anti-friction assembly in place is inserted in the hub shell 36'. It is evident that such construction does not in any manner limit the minimum size of the bearing member 12.

It will be appreciated that the bearing member portion 66 need not threadedly engage the axle 10. The threaded mounting may be replaced by a collar or other stop on the axle 10 which prevents inward movement of the portion 66 on the axle 10 beyond a desired point. The central bore of the bearing member portion 66 may be smooth in this case.

Without any sacrifice in performance or structural strength of the hub, the bearing races 14' and 30' can be made of identical small diameter, and the corresponding bearing races on the inner face of the hub shell 36' can likewise be made of uniform diameter. This permits both ball bearings which directly support the hub shell to be equipped with identical anti-friction assemblies, each consisting of a cage and of balls retained in the cage. The stock of spare parts and manufacturing parts required is thereby reduced, and the manufacture of the hub is facilitated.

The internal diameter of the hub shell 36' is substantially uniform throughout the entire axial length of the shell. The portions 69 and 70 of the inner face of the hub shell 36' which respectively engage the brake sleeve 54 and the clutch rollers 42 during back pedalling and normal pedalling are portions of a cylindrical wall of uniform diameter in which the outer bearing races for the balls 16 and 32 are recessed.

Figure 3:
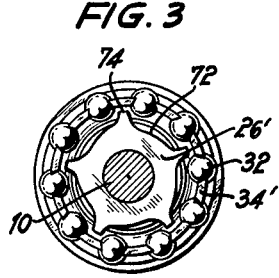
FIG. 3 is an axial view of a detail of the hub of FIG. 2.

This overall uniformity of the shell cavity is made possible in part by the dimensional relationship of the driver member 26' with the antifriction assembly mounted thereon, as better seen from the detail view of FIG. 3 taken in the direction of the hub axis. The driver member 26' has five inclined 72 on which five clutch rollers 42 (not seen in FIG. 3) travel radially and circumferentially toward and away from a position of frictional engagement with the hub shell 36'. Radially projecting stops 74 are interposed between adjacent inclined faces 72. The number of bearing balls 32 in the anti-friction assembly which is mounted on the race 30' of the driver member 26' is an integral multiple of the number of clutch rollers, namely ten. The minimum internal diameter of the anti-friction assembly is determined by portions of the balls 32, whereas the cage 34' has a greater internal diameter than the assembly taken as a unit. By providing a number of bearing balls which is an integral multiple of the number of clutch rollers, it is readily possible to slip the anti-friction assembly over a driver member 26' the maximum diameter of which is greater than the minimum diameter of the anti-friction assembly. The reduction in the diameter of the hub shell and the savings in material possible because of this fact are evident from joint consideration of FIGS. 1 and 2.

Figure 4:
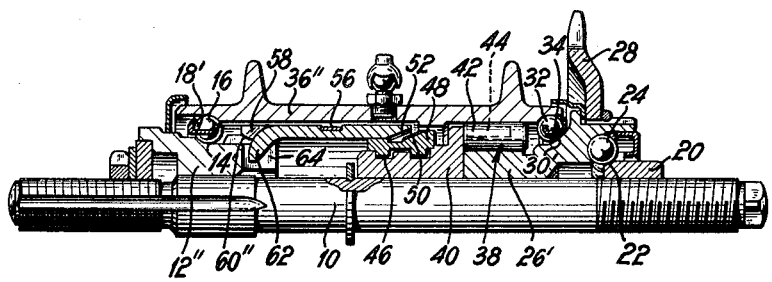
FIG. 4 shows a second embodiment of the coaster braker hub of the invention in axially sectional view, one half of the hub only being illustrated.
Figure 5:
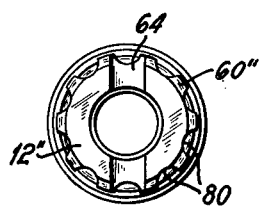
FIG. 5 is an axial view of certain elements of the hub of FIG. 4.
Figure 6:
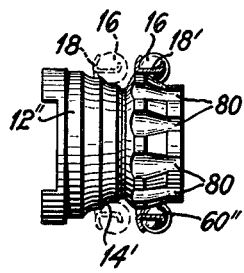
FIG. 6 shows the device of FIG. 5 in a view taken at right angles to the axis.

FIGS. 4, 5, and 6 show a second embodiment of the invention. The brake hub is illustrated in FIG. 4 in axial section. FIG. 5 and FIG. 6 respectively illustrate elements of one of the hub shell supporting bearings in views taken in the direction of the hub axis, and at right angles thereto.

The hub shown in FIGS. 4 to 6 is identical in structure and operation with a hub of FIGS. 2 and 3 except for details of the hub shell 36" in the second embodiment which is essentially a smooth cylindrical tube of uniform wall thickness, and for the bearing which supports the end of the hub shell remote from the sprocket 28. The internal bearing member 12" forms an integral part so that the face portion which constitutes the inner bearing race 14" is integral with the face or edge portion 60" which causes expansion of the brake sleeve upon axial displacement of the latter. Integrally formed is also the axial projections 64 which engage the lugs 62 of the brake sleeve and prevent the same from rotating with the hub shell 36″ during back pedalling.

The external diameter of the engagement face portion 60″ is greater than the minimum internal diameter of the anti-friction assembly constituted by the bearing balls 16 and the cage 18′ which retains them. The internal bearing member 12″ flares axially outward from the bearing race 14′ as best seen from FIG. 6 in which the ultimate assembled position of the anti-friction assembly is indicated in broken lines. It is necessary therefore to slip the anti-friction assembly over the engagement face portion 60″.

This is made possible by the provision of circumferentially spaced axially elongated recesses 80 in the internal bearing member 12″ which extend through the face portion 60″ into the bearing race 14′. There are as many recesses 80 in the bearing member 12″ as there are bearing balls 16 in the cage 18′, and the recesses 80 are uniformly spaced about the axis of the ball bearing in the same manner as the balls 16. It is possible simultaneously to align each ball with a corresponding recess, and to slip the anti-friction assembly in place on the bearing member 12. An intermediate position of the anti-friction assembly during this operation is illustrated in FIG. 6 in fully drawn lines. As seen from FIG. 5, the recesses 80 also extend over the axial length of the projections 64 as is necessary. The outer bearing race on the hub shell 36″ prevents the anti-friction assembly from displacement along the recesses 80 while the ball bearing is mounted in the hub shell.

It should be understood, of course, that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. In a wheel hub with coaster brake for a bicycle and the like, in combination,
   (a) a hub shell having an axis and defining an axial cavity, said shell having a bearing race in said cavity;
   (b) an internal bearing member arrangement having a first portion in said cavity formed with a bearing race opposite the bearing race of said hub shell, said first portion radially flaring from said bearing race thereof in a direction outward of said cavity, and a second portion in said cavity axially inward of said first portion, said second portion being provided with an engagement face of a diameter larger than the internal diameter of the bearing race of said first portion;
   (c) a plurality of anti-friction members interposed between said bearing races for rolling contact therewith;
   (d) annular cage means formed with a plurality of spaced recesses respectively receiving said anti-friction members and constituting therewith an annular anti-friction assembly, said arrangement including means for giving said anti-friction assembly axial access to said bearing race of the first portion diameter;
   (e) expandable brake sleeve means in said cavity having an axially flaring engagement face for engagement with said engagement face of said internal bearing member arrangement; and
   (f) actuating means for axially moving said brake sleeve means toward said bearing member arrangement while said faces are engaged.

2. In a hub as set forth in claim 1, engageable abutment means on said second portion and on said brake sleeve means for securing said bearing member arrangement and said brake sleeve means against relative rotation about said axis when said engagement faces thereof engage.

3. In hub as set forth in claim 1, said first and second portions being formed as separate parts, and said means for giving axial access including fastening means normally securing said separate parts to each other, and releasable for separation of said parts.

4. In a hub as set forth in claim 3, said fastening means including an externally threaded axle coaxial with said hub shell, said first portion being internally threaded and engaging said axle, a projection spaced from said axis on one of said separate parts and axially extending toward the other part, said other part being formed with an axial recess receiving said projection.

5. In a hub as set forth in claim 1, said portions jointly constituting an integral bearing member and said means for giving axial access, said bearing member being formed with a plurality of circumferentially spaced recesses simultaneously alignable with said anti-friction members, each of said recesses extending from said engagement face of said second portion to the bearing race of said first portion for axial passage of said assembly over said second portion.

6. In a hub as set forth in claim 1, said engagement faces being substantially conical about said axis.

7. In a hub as set forth in claim 1, stationary axle means in said hub shell, said interal bearing member arrangement being mounted on said axle means, said actuating means including a driver member rotatable on said axle means and having a portion in said cavity, said portion of said driver member having a bearing race spacedly facing a portion of said hub shell and having a diameter substantially equal to the diameter of the bearing race on said internal bearing member arrangement.

8. In a hub as set forth in claim 7, said actuating means further including a friction clutch in said cavity having a plurality of clutch rollers radially movable into and out of a position of simultaneous engagement with said driver member and said hub shell, said clutch rollers being spaced about said axis, a plurality of anti-friction members on said bearing race of said driver member, and cage means formed with a plurality of recesses respectively receiving said anti-friction members in circumferentially spaced relationship, the number of said anti-friction members being an integral multiple of the number of said rollers.

9. In a hub as set forth in claim 8, said hub shell having an additional bearing race opposite the bearing race of said driver member for rolling contact with the anti-friction members thereon, said hub shell having an internal face of substantially circular cross-section, a portion of said internal face axially intermediate the two races on said hub shell engaging said clutch rollers when the same move radially outward, said portion of said internal face and respective other portions of said face contiguously adjacent said two races having substantially the same diameter, said two bearing races extending radially inwardly of said hub shell from said internal face.

10. In a hub as set forth in claim 2, said brake sleeve means being tubular and substantially coaxial with said hub shell, said abutment means including lug means radially projecting from said sleeve means toward said axis, and an axial projection on said second portion engageable with said lug means.

References Cited by the Examiner
UNITED STATES PATENTS 2,081,567 5/37 Winkler _____ 192—6
2,151,324 3/39 Jordan _____ 192—6

DAVID J. WILLIAMOWSKY, *Primary Examiner.*

THOMAS J. HICKEY, *Examiner.*